United States Patent
Mohanty et al.

(10) Patent No.: US 11,058,995 B2
(45) Date of Patent: Jul. 13, 2021

(54) PROCESS FOR MAKING A POROUS FILTER ELEMENT, POROUS FILTER ELEMENTS MADE THEREBY, AND FILTER DEVICES INCLUDING THEM

(71) Applicant: Saint-Gobain Performance Plastics Corporation, Solon, OH (US)

(72) Inventors: Ashok K. Mohanty, Solon, OH (US); Adam P. Nadeau, Solon, OH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/720,530

(22) Filed: Sep. 29, 2017

(65) Prior Publication Data
US 2018/0093227 A1    Apr. 5, 2018

Related U.S. Application Data

(60) Provisional application No. 62/402,643, filed on Sep. 30, 2016.

(51) Int. Cl.
*B01D 63/08* (2006.01)
*B01D 65/00* (2006.01)
(Continued)

(52) U.S. Cl.
CPC ....... *B01D 63/081* (2013.01); *B01D 39/1692* (2013.01); *B01D 65/003* (2013.01);
(Continued)

(58) Field of Classification Search
CPC ............... B01D 65/003; B01D 63/081; B29C 66/73118; B29C 65/7894; B29C 65/16; B29C 65/1635; B29C 65/1632
See application file for complete search history.

(56) References Cited

U.S. PATENT DOCUMENTS 3,560,291 A    2/1971 Foglia et al.
4,069,080 A    1/1978 Osborne
(Continued)

OTHER PUBLICATIONS

Laser Welding of Engineering Plastics, Technical Information, downloaded from http://product-finder.basf.com/group/corporate/product-finder/en/literature-document:/Brand+Ultradur-Brochure--Laser+Welding+of+Engineering+Plastics-English.pdf, downloaded Aug. 30, 2016.

*Primary Examiner* — Daniel McNally
(74) *Attorney, Agent, or Firm* — McDonnell Boehnen Hulbert & Berghoff LLP

(57) ABSTRACT

The present disclosure relates more to processes for making a filter element that includes a filter membrane having a strip of thermoplastic polymer material laminated thereto, for example, as a strip along an edge of the filter membrane. For example, one such process includes providing a sheet of filter membrane having a first surface and an opposed second surface; providing a strip of thermoplastic polymer material having a first surface and an opposed second surface; contacting the first surface of the strip of thermoplastic polymer material with the first surface of the filter membrane; and softening the strip of thermoplastic polymer material at at least its first surface by irradiation with laser radiation; such that the softened polymer material of the first surface of the strip of thermoplastic polymer material bonds to the first surface of the filter membrane upon hardening.

19 Claims, 7 Drawing Sheets

(51) Int. Cl.
*B01D 69/12* (2006.01)
*B01D 39/16* (2006.01)
*B29C 65/00* (2006.01)
*B29C 65/16* (2006.01)
*B29C 65/78* (2006.01)
*B01D 71/06* (2006.01)
*B01D 71/34* (2006.01)
*B01D 69/02* (2006.01)
*B01D 71/68* (2006.01)
*B01D 71/36* (2006.01)
*B29L 31/14* (2006.01)

(52) U.S. Cl.
CPC .............. *B01D 69/12* (2013.01); *B29C 65/16* (2013.01); *B29C 65/1632* (2013.01); *B29C 65/1635* (2013.01); *B29C 65/1658* (2013.01); *B29C 65/1677* (2013.01); *B29C 65/7894* (2013.01); *B29C 66/1122* (2013.01); *B29C 66/30326* (2013.01); *B29C 66/344* (2013.01); *B29C 66/41* (2013.01); *B29C 66/45* (2013.01); *B29C 66/472* (2013.01); *B29C 66/727* (2013.01); *B29C 66/73118* (2013.01); *B29C 66/73921* (2013.01); *B29C 66/81422* (2013.01); *B29C 66/836* (2013.01); *B29C 66/8341* (2013.01); *B29C 66/83411* (2013.01); *B29C 66/83413* (2013.01); *B29C 66/83415* (2013.01); *B29C 66/91* (2013.01); *B01D 63/08* (2013.01); *B01D 69/02* (2013.01); *B01D 71/06* (2013.01); *B01D 71/34* (2013.01); *B01D 71/36* (2013.01); *B01D 71/68* (2013.01); *B01D 2239/065* (2013.01); *B29C 65/167* (2013.01); *B29C 65/1612* (2013.01); *B29C 65/1616* (2013.01); *B29C 65/1619* (2013.01); *B29C 65/1622* (2013.01); *B29C 65/1683* (2013.01); *B29C 65/1687* (2013.01); *B29C 66/026* (2013.01); *B29C 66/028* (2013.01); *B29C 66/02245* (2013.01); *B29C 66/71* (2013.01); *B29C 66/7352* (2013.01); *B29L 2031/14* (2013.01)

(56) References Cited

U.S. PATENT DOCUMENTS

| | | | |
|---|---|---|---|
| 4,101,423 | A | 7/1978 | Merrill et al. |
| 4,512,892 | A | 4/1985 | Ganzi et al. |
| 4,879,450 | A | 11/1989 | Valentin et al. |
| 4,906,371 | A | 3/1990 | Miller |
| 4,956,089 | A | 9/1990 | Hurst |
| 5,238,717 | A | 8/1993 | Boylan |
| 5,279,693 | A | 1/1994 | Robinson et al. |
| 5,411,616 | A | 5/1995 | Desai et al. |
| 6,103,050 | A | 8/2000 | Krueger |
| 6,193,833 | B1 | 2/2001 | Gizowski et al. |
| 6,384,369 | B1 | 5/2002 | Stenersen et al. |
| 6,739,459 | B1 | 5/2004 | Hartmann |
| 6,913,786 | B2 | 7/2005 | Proulx et al. |
| 2003/0000874 | A1* | 1/2003 | Proulx ................. B01D 63/061 210/85 |
| 2003/0213741 | A1 | 11/2003 | Wright et al. |
| 2005/0000641 | A1 | 1/2005 | Hartmann et al. |
| 2005/0003721 | A1* | 1/2005 | Greulich ............. B29C 65/1654 442/67 |
| 2005/0012793 | A1* | 1/2005 | Kwan ................. B29C 65/1635 347/86 |
| 2005/0252849 | A1 | 11/2005 | Wright et al. |
| 2008/0276584 | A1* | 11/2008 | Driesen ................. B01D 29/111 55/502 |
| 2009/0117366 | A1* | 5/2009 | Honma ................. B29C 70/086 428/314.8 |
| 2010/0221995 | A1* | 9/2010 | Furuyama ......... B29C 66/81427 454/284 |
| 2011/0067775 | A1* | 3/2011 | Simonsohn ........ H02G 15/1833 138/106 |
| 2012/0211154 | A1* | 8/2012 | Brownell ................ B32B 39/00 156/272.8 |

* cited by examiner

PROCESS FOR MAKING A POROUS FILTER ELEMENT, POROUS FILTER ELEMENTS MADE THEREBY, AND FILTER DEVICES INCLUDING THEM

CROSS-REFERENCE TO RELATED APPLICATIONS

This application claims the benefit of priority of U.S. Provisional Patent Application No. 62/402,643, filed Sep. 30, 2016, which is hereby incorporated herein by reference in its entirety.

BACKGROUND OF THE DISCLOSURE

1. Field of the Disclosure

The present disclosure relates generally to filter elements made from filter membranes. The present disclosure relates more particularly to processes for making a filter element that includes a filter membrane having a strip of thermoplastic polymer material laminated thereto, for example, as a strip along an edge of the filter membrane.

2. Technical Background

There are a variety of filter media that are available in the form of a membrane. These membranes are typically formed from porous or fibrous material, and operate to filter out large-size particles by size exclusion. The membranes are generally relatively thin, and have a high degree of porosity, e.g., 50-80% by volume. Filter membranes are formed from a wide variety of materials, e.g., polyethersulfone, cellulosic materials such cellulose acetate and/or cellulose nitrate, nylon, poly(vinylidine difluoride), poly(tetrafluoroethylene), polypropylene and polycarbonate.

A filter membrane is typically provided in sheet form, then incorporated into a cartridge or other device. Often, the filter membrane sheet is folded or pleated to increase its surface area in the final device; this can make the membrane itself it even weaker. The filter membrane is typically secured to the device housing, endcap, or some other device element via its edge. An adhesive or other potting material can be used to bond the edge of the filter membrane to the remainder of the device. A strong bond between the filter membrane and the remainder of the device is desirable, as the device can experience high fluid pressures, especially when the pore size of the filter membrane is small. However, in many cases, the potting material is dissimilar from the material of the filter membrane, such that the potting material does not make a sufficient adhesive bond directly with the filter membrane.

One technique commonly used in filter manufacture is to heat-laminate or extrude a strip of thermoplastic polymer material onto the filter membrane. These processes can ensure a strong bond between the thermoplastic polymer material and the filter membrane, while the thermoplastic polymer material itself can be selected to provide for a strong bond with the potting material and thus with the remainder of the device. But these processes can suffer from a number of setbacks. They can be slow, and can be difficult to customize in that they require long times and high cost to change lamination materials and the arrangement of the thermoplastic polymer material with respect to the underlying sheet of filter membrane material.

SUMMARY OF THE DISCLOSURE

In one aspect, the present disclosure provides a process for making a filter element comprising a filter membrane having a strip of thermoplastic polymer material laminated thereto, the method including:
  providing a sheet of filter membrane having a first surface and an opposed second surface;
  providing a strip of thermoplastic polymer material having a first surface and an opposed second surface;
  contacting the first surface of the strip of thermoplastic polymer material with the first surface of the filter membrane; and
  softening the strip of thermoplastic polymer material at at least its first surface by irradiation with laser radiation; such that the softened polymer material of the first surface of the strip of thermoplastic polymer material bonds to the first surface of the filter membrane upon hardening.

Another aspect of the disclosure is a filter element made by any process as described herein.

In another aspect, the present disclosure provides a filter device (e.g., a filter cartridge) that includes a filter element as described above. In certain such devices, the second surface of the strip of thermoplastic polymer material is adhered to an element of the filter device (e.g., a structural element such as a device housing or an endcap).

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
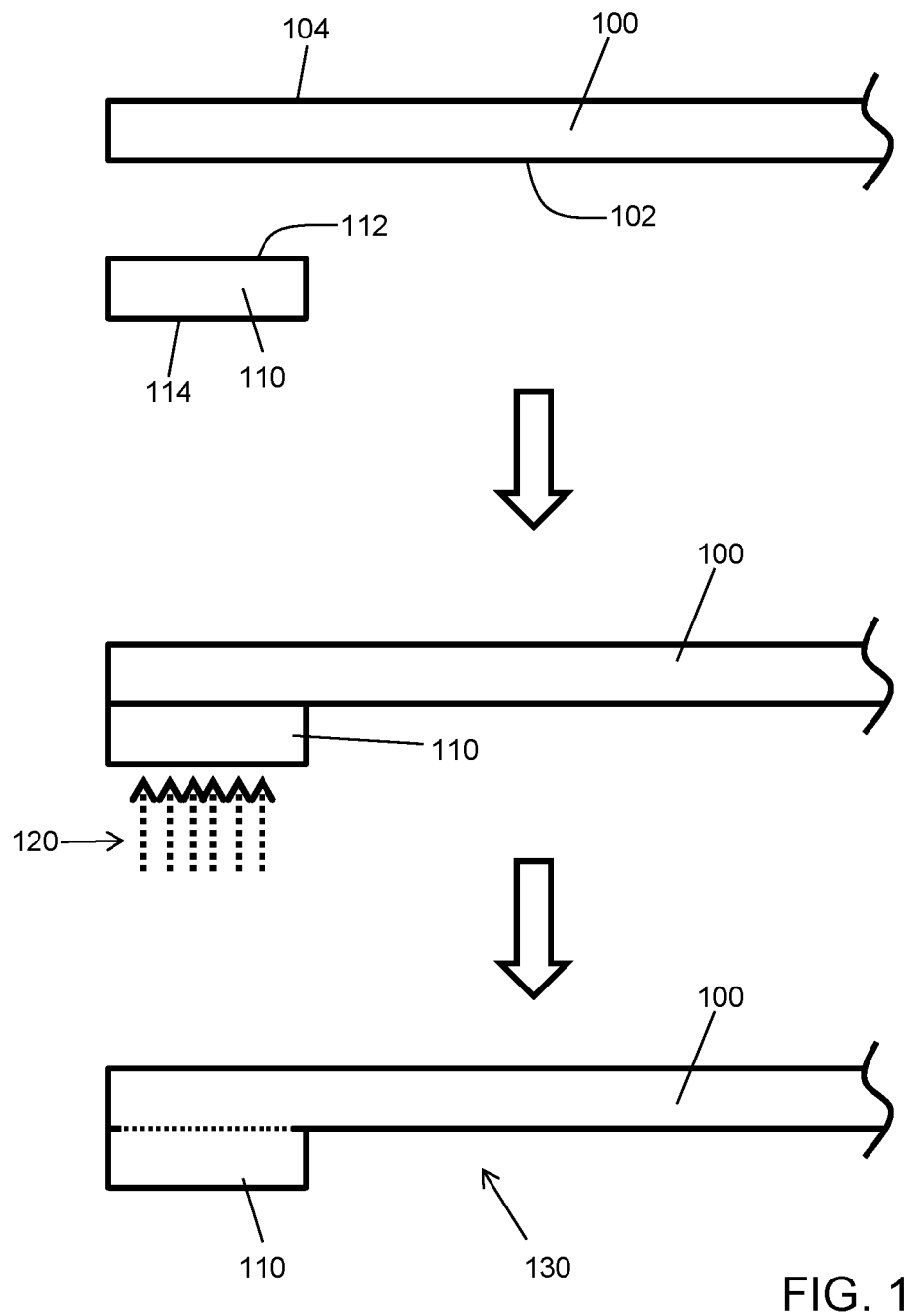
FIG. 1 is a schematic cross-sectional view of a process according to one aspect of the disclosure.

The present inventors have noted that existing processes, especially lamination processes, have a number of disadvantages. The inventors have studied certain "heated nip" lamination processes, in which the strip of thermoplastic polymer material and the filter membrane are passed together through a pair of rollers, at least one of which is heated. Heat transfers from the rollers and softens the thermoplastic polymer material and/or the filter membrane to laminate them together. However, such processes can be difficult to efficiently perform industrially. For example, they can be difficult to perform with very thin membrane materials. The heat from the heated rollers can cause damage to the filter membrane, e.g., to form wrinkles in the membrane, or even a change in porosity of the membrane. The thermoplastic polymer material can have the tendency to break and to stick to the heated roller. And it can be difficult to identify a set of conditions that provides good adhesion of the thermoplastic polymer material to the filter membrane; indeed, for some material combinations in a given nip roller system there may be no such set of conditions feasible.

Accordingly, one aspect of the disclosure is a process for making a filter element that includes a filter membrane having a strip of thermoplastic polymer material laminated thereto. One embodiment of such a process is described with respect to the schematic cross-sectional view of FIG. 1. The process includes providing a sheet of a filter membrane 100 having a first surface 102 and an opposed second surface 104; and a strip of thermoplastic polymer material 110 having a first surface 112 and an opposed second surface 114. The first surface 102 of the filter membrane 100 is brought into contact with the first surface 112 of the strip of thermoplastic polymer material 110, and the strip of thermoplastic polymer material is softened at at least its first surface by irradiation with laser radiation 120 (e.g., from laser 125). The combination of contacting the materials with one another and the laser irradiation is performed such that the softened polymer material of the first surface of the strip of thermoplastic polymer material bonds to the first surface of the filter membrane upon hardening (e.g., when the material is no longer irradiated by the laser radiation). The resulting filter membrane 130 includes the strip of thermoplastic material 110 laminated to the filter membrane, i.e., at the first surfaces 102 and 112 thereof.

The person of ordinary skill in the art will appreciate that a wide variety of filter membrane materials can be used in the practice of the processes and devices of the present disclosure. For example, in certain embodiments of the processes and devices as otherwise described herein, the base material of the filter membrane is polyethersulfone (PES). In other embodiments of the processes and devices as otherwise described herein, the base material of the filter membrane is poly(tetrafluoroethylene) (PTFE). In still other embodiments of the processes and devices as otherwise described herein, the base material of the filter membrane is poly(vinylidene difluoride) (PVDF). In various additional embodiments of the processes and devices as otherwise described herein, the base material of the filter membrane is a cellulosic material such cellulose acetate and/or cellulose nitrate, nylon, polypropylene or polycarbonate. As the person of ordinary skill in the art will appreciate, when the base material of the filter membrane is hydrophobic (for example, made from a fluorinated material), it can be desirable to render it hydrophilic, so that aqueous fluids can more easily pass therethrough. Thus, the filter membrane can be coated or otherwise treated to render it hydrophilic, e.g., as described in U.S. Pat. Nos. 4,994,879; 6,734,386 and 7,717,273.

As the person of ordinary skill in the art will appreciate, filter membranes are typically very thin. The present inventors have determined that conventional nip roller lamination processes can be especially difficult when used with thin membranes. The high level of temperature control afforded by the laser welding processes as described herein can allow for successful lamination of even thin, fragile membrane materials. For example, in certain embodiments of the processes and devices as otherwise described herein, the filter membrane is in the range of about 10 µm to about 300 µm in thickness. For example, in various embodiments of the processes and devices as otherwise described herein, the filter membrane is in the range of about 10 µm to about 200 µm, or about 10 µm to about 125 µm, or about 10 µm to about 60 µm, or about 10 µm to about 30 µm, or about 20 µm to about 300 µm, or about 20 µm to about 200 µm, or about 20 µm to about 125 µm, or about 20 µm to about 60 µm. The person of ordinary skill in the art will appreciate, however, that filter membranes of other thicknesses can be laminated using the processes described herein.

In certain embodiments of the processes and devices as otherwise described herein, it can be useful to pretreat the first surface of the filter membrane (i.e., before contacting it with the first surface of the strip of thermoplastic polymer material) in order to increase adhesion. Several such methods are familiar to the person of ordinary skill in the art, including plasma treatment, corona discharge treatment, ozonation, abrasion and chemical etching. Such treatment can be performed, for example, shortly before the laser welding processes described herein, so that the surface is freshly treated at the time of the laser welding. However, in certain embodiments, such pretreatment is not performed, as in many cases the laser welding processes described herein can provide adequate bond strength in the absence of pretreatment.

Similarly, a wide variety of thermoplastic polymer materials can be used in the practice of the processes and devices of the present disclosure. The person of ordinary skill in the art can select a thermoplastic polymer material based on, for example, the material with which the second side of the thermoplastic polymer material will interface in an assembled device, e.g., a plastic housing or endcap. For example, in certain embodiments of the processes and devices as otherwise described herein, the thermoplastic polymer material is polypropylene. In other embodiments of the processes and devices as otherwise described herein, the thermoplastic polymer material is nylon. The person of ordinary skill in the art will appreciate that a variety of other suitable thermoplastic materials may be used, e.g., polyethylene, poly(vinylidine dichloride), ethylene-vinyl acetate copolymers, polyamides, acrylics, methacrylics, perfluoroalkoxy copolymers, and poly(tetrafluoroethylene). Moreover, in certain embodiments, the thermoplastic polymer material is a blend of thermoplastic polymers. For example, in certain embodiments of the processes and devices as otherwise described herein, the thermoplastic polymer material is a nylon/propylene blend, e.g., in the range of 10% nylon/90% polypropylene to 90% nylon/10% polypropylene, or in the range of 20% nylon/80% polypropylene to 80% nylon/20% polypropylene. For example, in particular embodiments, the thermoplastic polymer material can be 25% nylon/75% polypropylene, 50% nylon/50% polypropylene, or 75% nylon/25% polypropylene. In certain desirable embodiments, the thermoplastic polymer material is not fluorinated. Notably, in many desirable embodiments, the thermoplastic polymer material is different from the base material of the filter membrane.

In certain embodiments of the processes and devices as otherwise described herein, the strip of thermoplastic polymer material is formed from a single thermoplastic polymer, e.g., all nylon or all polypropylene. In other embodiments of the processes and devices as otherwise described herein, the strip of thermoplastic polymer material is formed from two or more different layers of thermoplastic polymer. For example, in certain embodiments, the strip of thermoplastic polymer material includes a first layer at the first surface thereof, and a second layer at the second surface thereof (e.g., optionally with one or more layers disposed therebetween). The first layer can be formed from, for example a heat meltable adhesive, or some other polymer that has the desired melting characteristics (e.g., as described below). The second layer can be formed from, e.g., nylon or polypropylene. The person of ordinary skill in the art will appreciate that multi-layer strips of thermoplastic polymer material can be made from a wide variety of materials and configured in a wide variety of different manners.

The strip of thermoplastic polymer can have a variety of thicknesses, as would be appreciated by the person of ordinary skill in the art. The strip of thermoplastic polymer is desirable thick enough to provide sufficient interfaces between the filter membrane and, e.g., a plastic housing or endcap material to which the filter membrane is sealed. In certain embodiments of the processes and devices as otherwise described herein, the strip of thermoplastic polymer material is in the range of about 10 µm to about 300 µm in thickness. For example, in various embodiments of the processes and devices as otherwise described herein, the strip of thermoplastic polymer material is in the range of about 10 µm to about 200 µm, or about 10 µm to about 125 µm, or about 10 µm to about 60 µm, or about 10 µm to about 30 µm, or about 20 µm to about 300 µm, or about 20 µm to about 200 µm, or about 20 µm to about 125 µm, or about 20 µm to about 60 µm. The person of ordinary skill in the art will appreciate, however, that strips of thermoplastic polymer material of other thicknesses can be laminated using the processes described herein.

In certain embodiments of the processes and devices as described herein, the material of the filter membrane and the strip of thermoplastic polymer material are selected such that the melting point of the thermoplastic polymer at the first surface of the strip of thermoplastic polymer material is substantially lower than the softening point of the material of the filter membrane. In such cases, the thermoplastic polymer material can embed into the voids or pores of the material of the filter membrane, to improve bonding via mechanical interlocking. Thus, in certain embodiments of the processes and devices as described herein, the softening point of the thermoplastic polymer material is at least 10° C. lower, e.g., at least 20° C. lower than the softening point of the material of the filter membrane. In certain such embodiments, the softening point of the thermoplastic polymer material is at least 50° C., e.g., at least 75° C. or even at least 100° C. lower than the softening point of the material of the filter membrane. The melting point of the thermoplastic polymer at the first surface of the strip of thermoplastic polymer material can be determined via differential scanning calorimetry, as is familiar to the person of ordinary skill in the art. The softening point of the membrane material can be determined as the Vicat softening point, and can be determined on an appropriately-thick sample of the base polymer material of the filter membrane (i.e., instead of on a thin filter membrane itself). But the person of ordinary skill in the art will appreciate that in other embodiments, other temperature relationships can apply between the materials.

In certain embodiments of the processes and devices as otherwise described herein, the base material of the filter membrane is PTFE, and the thermoplastic polymer material is polypropylene. In other embodiments of the processes and devices as otherwise described herein, the base material of the filter membrane is PTFE, and the thermoplastic polymer material is nylon. In other embodiments of the processes and devices as otherwise described herein, the base material of the filter membrane is PES, and the thermoplastic polymer material is nylon. In other embodiments of the processes and devices as otherwise described herein, the base material of the filter membrane is PES, and the thermoplastic polymer material is polypropylene. In other embodiments of the processes and devices as otherwise described herein, the base material of the filter membrane is PVDF, and the thermoplastic polymer material is polypropylene. In other embodiments of the processes and devices as otherwise described herein, the base material of the filter membrane is PVDF, and the thermoplastic polymer material is nylon.

As noted above, the strip of thermoplastic polymer material is softened at at least its first surface by irradiation with laser radiation; and the first surface of the strip of thermoplastic polymer material is contacted with the first surface of the filter membrane, such that the softened polymer material of the first surface of the strip of thermoplastic material bonds to the first surface of the filter membrane upon hardening. The operations of softening and contacting can be performed in any desirable order, as long as the material of the first surface of the strip of thermoplastic material is in contact with the first surface of the filter membrane while in a softened state, such that it can form a bond with the first surface of the filter membrane. For example, as described with respect to FIGS. 2 and 3 below, the first surface of the strip of thermoplastic polymer can first be contacted with the first surface of the filter membrane, then the material at the first surface of the strip of thermoplastic polymer can be softened while it is in contact with the filter membrane.

One problem with the prior art nip roller processes is that the squeezing of the materials between the rollers can damage the filter membrane, especially when the nip roller is heated in order to soften the thermoplastic polymer material. Notably, in certain embodiments, the processes described herein can be performed without substantially contacting both the second surface of the strip of thermoplastic material and the second surface of the filter membrane in the neighborhood of the strip of thermoplastic polymer material (e.g., within 2 cm of the strip of thermoplastic polymer material) with process equipment members (e.g., a roller or a platen) while the first surface of the strip of thermoplastic polymer material is in a softened state. For example, as described below with respect to FIG. 2, in certain embodiments of the processes and devices as described herein, the second surface of the strip of thermoplastic polymer material is not contacted with a process equipment member (such as a roller or a platen) while the material of the first surface of the strip of thermoplastic polymer material is in a softened state. In certain such embodiments, the second surface of the filter membrane (e.g., within 2 cm of the strip of thermoplastic polymer material) is contacted with a process equipment member while the material of the first surface of the strip of thermoplastic polymer material is in a softened state. In other embodiments of the processes and devices as described herein, and as described below with respect to FIG. 3, the second surface of the filter membrane in the neighborhood of the strip of thermoplastic polymer material (e.g., within 2 cm of the strip of thermoplastic polymer material) is not contacted with a process equipment member (such as a roller or a platen) while the material of the first surface of the strip of thermoplastic polymer material is in a softened state. In certain such embodiments, the second surface of the strip of thermoplastic polymer material is contacted with a process equipment member while the material of the first surface of strip of the thermoplastic polymer material is in a softened state.

Use of laser radiation to soften the strip of thermoplastic polymer material at at least its first surface can be advantaged in that it can provide highly localized heating of the strip of thermoplastic material, and can avoid substantially heating the filter membrane in regions remote from the strip of thermoplastic material. For example, in certain embodiments of the processes and devices described herein, the irradiation does not cause the temperature of the filter membrane to increase by more than 30° C., by more than 20° C., or even by more than 10° C. at any region more than 2 cm from the strip of thermoplastic polymer material. In certain such embodiments, the irradiation does not cause the temperature of the filter membrane to increase by more than 30° C., by more than 20° C., or even by more than 10° C. at any region more than 1 cm from the strip of thermoplastic polymer material. In certain such embodiments, the irradiation does not cause the temperature of the filter membrane to increase by more than 30° C., by more than 20° C., or even by more than 10° C. at any region more than 0.5 cm from the strip of thermoplastic polymer material.

Moreover, when the materials of the strip of thermoplastic polymer (i.e., at at least its first surface) and the filter membrane are sufficiently different, the thermoplastic polymer material can soften, and even melt, at temperatures that are substantially below the softening point of the material of the filter membrane. Accordingly, in certain embodiments of the processes and devices described herein, the temperature of the strip of thermoplastic material at the first surface thereof is at least 20° C., for example, at least 50° C. less than the softening point of the material of the filter membrane when they are in contact with one another. In certain such embodiments, the temperature of the strip of thermoplastic material at the first surface thereof is at least 100° C., for example, at least 125° C. less than the softening point of the material of the filter membrane.

Figure 2:
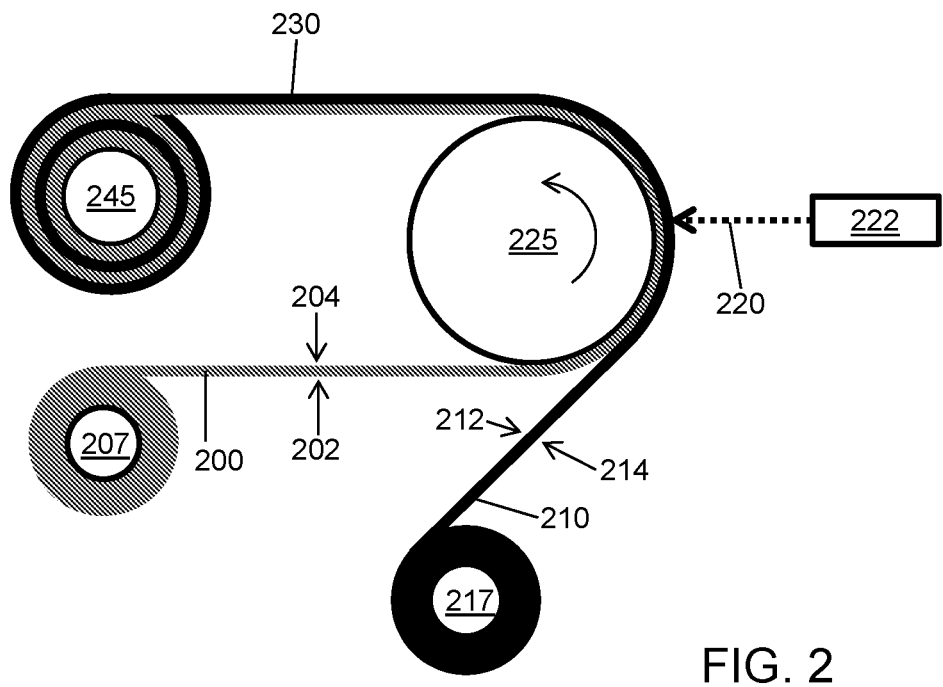
FIG. 2 is a schematic cross-sectional view of a process according to one embodiment of the disclosure.

One embodiment of a process according to the disclosure is shown in schematic cross-sectional view in FIG. 2. In the embodiment of FIG. 2, the filter membrane 200 and the strip of thermoplastic polymer material 210 are supplied from spools 207 and 217. Filter membrane 200 has a first surface 202 and an opposed second surface 204, while the strip of thermoplastic polymer material 210 has a has a first surface 212 and an opposed second surface 214. The materials are contacted with one another, first surface to first surface, on a roller 225. The arrow denotes the direction of rotation of the roller 225; accordingly the filter membrane and the strip of thermoplastic polymer material are contacted together along the surface of the roller. While the materials are disposed against the roller, the strip of thermoplastic polymer material is irradiated from the second surface thereof by laser radiation 220 (e.g., from laser 222), such that at least the first surface of the thermoplastic polymer material softens. As the materials are conducted away from the laser radiation, the softened material hardens and bonds to the filter membrane, as described above. The laminated filter element 230 is then collected on a spool 245. In the embodiment of FIG. 2, the second surface of the strip of thermoplastic polymer material is not contacted with a process equipment member while the material of the first surface of the strip of thermoplastic polymer material is in a softened state. Accordingly, there is no pinching or grabbing of the materials that can deform or damage the material of the filter membrane.

Figure 3:
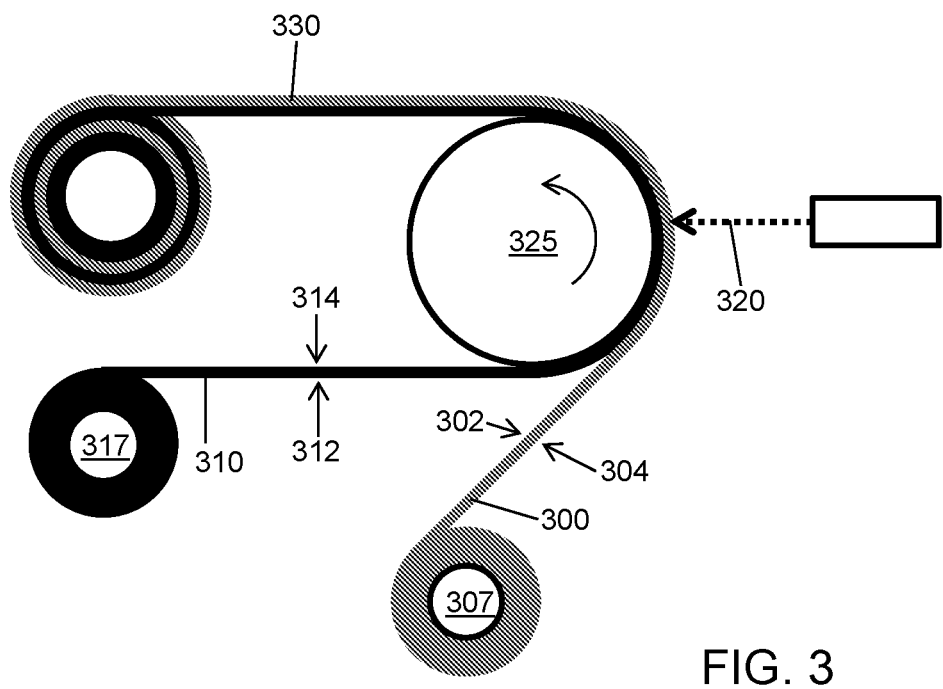
FIG. 3 is a schematic cross-sectional view of a process according to another embodiment of the disclosure.

Another embodiment of a process according to the disclosure is shown in schematic cross-sectional view in FIG. 3. In the embodiment of FIG. 3, the filter membrane 300 and the strip of thermoplastic polymer material 310 are supplied from spools 307 and 317. Filter membrane 300 has a first surface 302 and an opposed second surface 304, while the strip of thermoplastic polymer material 310 has a has a first surface 312 and an opposed second surface 314. The materials are contacted with one another, first surface to first surface, on a roller 325. The arrow denotes the direction of rotation of the roller 325; accordingly the filter membrane and the strip of thermoplastic polymer material are contacted together along the surface of the roller. This embodiment differs from the embodiment of FIG. 2 in that the filter membrane is on top of the strip of thermoplastic polymer on the roller. While the materials are disposed against the roller, the filter membrane is irradiated from the second surface thereof with laser radiation 320, such that at least the first surface of the thermoplastic polymer material softens. In this embodiment, the filter membrane is sufficiently transmissive to the laser radiation to allow sufficient radiation to be transmitted to the underlying strip of thermoplastic material. Here, in certain embodiments, the strip of thermoplastic polymer material is substantially more absorptive of the radiation than is the filter membrane, e.g., through the use of an absorptive component. But in other embodiments, the filter membrane is thin enough to allow a substantial amount of radiation through, despite the facts that it itself absorbs substantial radiation. In such embodiments, the difference in softening temperatures of the materials is desirably large, as described above. In the embodiment of FIG. 3, the second surface of the filter membrane is not contacted with a process equipment member while the material of the first surface of the strip of thermoplastic polymer material is in a softened state. Accordingly, there is no pinching or grabbing of the materials that can deform or damage the material of the filter membrane.

In the embodiments of FIGS. 2 and 3, the materials are conducted across a rotating roller, for example, by the spool that collects the laminated filter element. The person of ordinary skill in the art will appreciate that other types of fixtures could be used in the irradiation of the materials. For example, the materials can be conducted against a platen, e.g., a platen with a concave surface. In the embodiments of FIGS. 2 and 3, the laser radiation is provided from a stationary source, with the materials moving with respect to the laser radiation during the irradiation. This can desirably allow for continuous processes. But in other embodiments, the materials are stationary during the radiation. For example, the materials can be held against a platen and the laser radiation moved in a path to weld, e.g., a slanting or non-linear strip of thermoplastic polymer material to the filter membrane. In another embodiment, the laser radiation is formed in the shape of the desired weld pattern, e.g., through the use of multiple laser sources with separate focusing optics to form the pattern of the laser weld.

Figure 4:
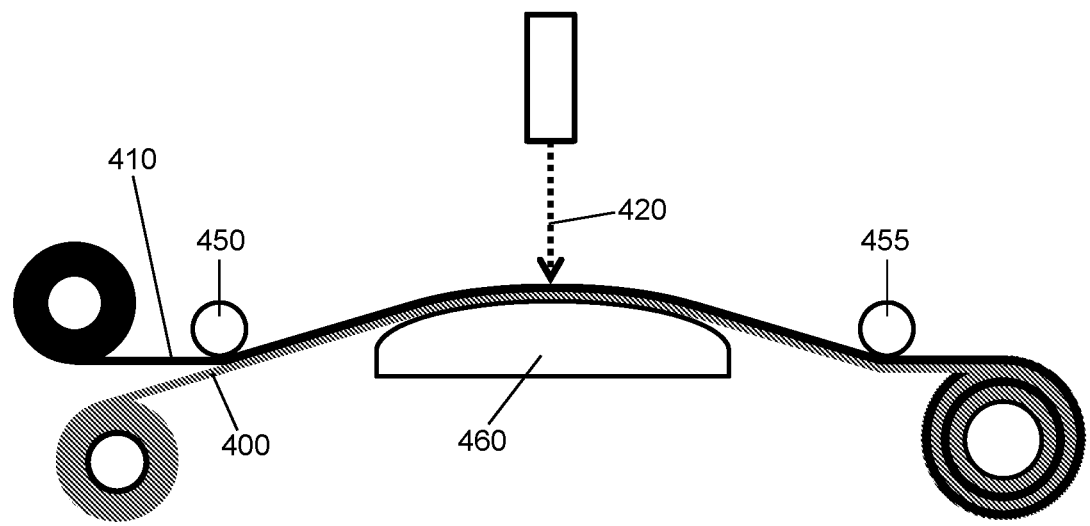
FIG. 4 is a schematic cross-sectional view of a process according to another embodiment of the disclosure.

In certain embodiments, the materials are disposed against a surface during the irradiation with sufficient pressure to force intimate contact between the first surface of the filter membrane and the first surface of the strip of thermoplastic polymer material. The pressure is desirably sufficient to cause the material at the first surface of the strip of thermoplastic polymer material, when softened, to embed itself into the pores or voids of the filter membrane. For example, in the embodiments of FIGS. 2 and 3, tension between one or more of the spools holding the filter membrane and thermoplastic polymer material feedstocks and the spool collecting the laminated filter element can provide sufficient tension. The person of ordinary skill in the art will appreciate that one or more separate rollers can likewise be used to provide sufficient tension. For example, in the embodiment of FIG. 4, rollers 450 and 455 cause the sheet of filter membrane 400 and the strip of thermoplastic material 410 to be held against a platen 460 with sufficient pressure to cause the material at the first surface of the strip of thermoplastic polymer material, when softened by laser radiation 420, to embed itself into the to cause the material at the first surface of the strip of thermoplastic polymer material, when softened, to embed itself into the pores or voids of the filter membrane.

Figure 5:
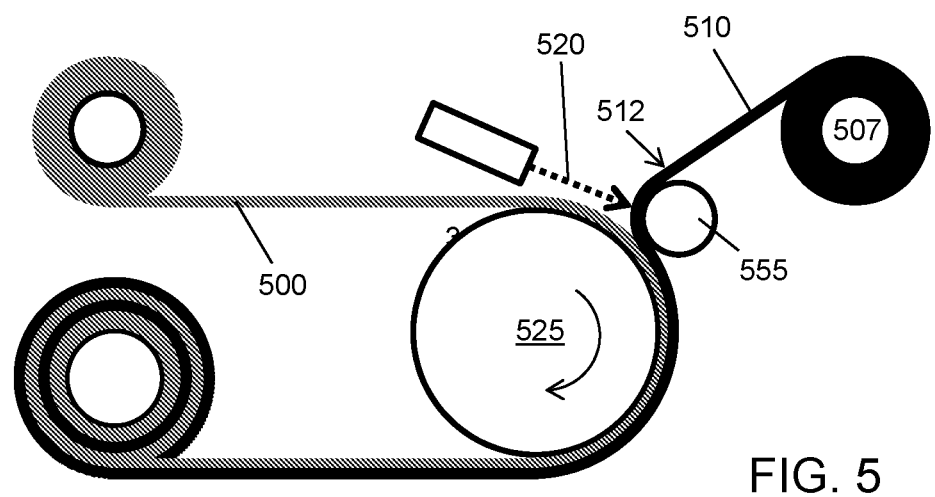
FIG. 5 is a schematic cross-sectional view of a process according to another embodiment of the disclosure.

While in the embodiments described above, first surface of the strip of thermoplastic polymer is first contacted with the first surface of the filter membrane, then the material at the first surface of the strip of thermoplastic polymer is softened while it is in contact with the filter membrane. In other embodiments of the processes and devices as otherwise described herein, however, the strip of thermoplastic polymer material is softened at at least its first surface by irradiation with laser radiation before it is contacted with the first surface of the filter membrane. For example, in the embodiment of FIG. 5, the strip of thermoplastic polymer material 510 is fed from roll 517 and heated with laser radiation 520 at at least the first surface 512 thereof. The strip of thermoplastic polymer material and the filter membrane 500 are then fed together through roller 525 and roller 555 to contact them with one another, while the material at the first surface of the strip of thermoplastic polymer material is still in a softened state.

In certain of the embodiments described above, either the second surface of the filter membrane or the second surface of the strip of thermoplastic polymer material is not contacted with a process equipment member while the material of the first surface of the strip of thermoplastic polymer material is in a softened state; that is, in such embodiments, the materials are not squeezed between process equipment members while the material of the first surface of the strip of thermoplastic polymer material is in a softened state. However, the use of a nip roller or similar pressure-applying process equipment members can be desirable in that it can help force the softened material at the first surface of the strip of thermoplastic polymer material into more intimate contact with the filter membrane. Accordingly, in other embodiments of the processes described herein, the filter membrane and the strip of thermoplastic polymer material are fed through opposing process equipment members (e.g., rollers, or a roller and a platen) such that both the second surface of the filter membrane and the second surface of the strip of thermoplastic polymer material are contacted with the opposing process equipment members while the material of the first surface of the strip of thermoplastic polymer material is in a softened state. For example, in the embodiment of FIG. 5, the materials are fed through roller 525 and roller 555 after the laser irradiation. In certain such embodiments, the second surface of the strip of thermoplastic polymer material is not in a softened state when it is contacted by one of the opposing process equipment members.

Figure 6:
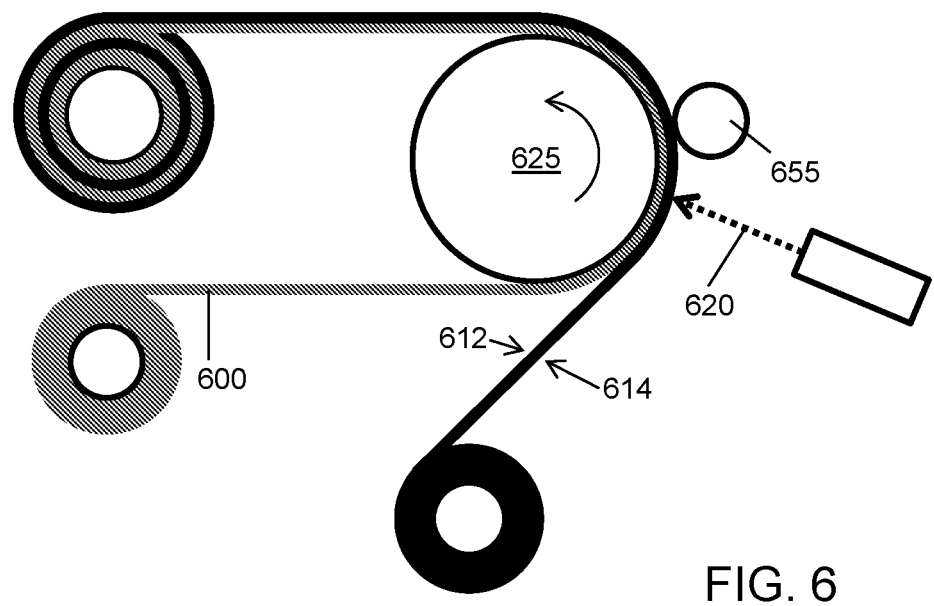
FIG. 6 is a schematic cross-sectional view of a process according to another embodiment of the disclosure.

In other embodiments of the processes as otherwise described herein, the filter membrane and the strip of thermoplastic polymer material are fed through opposing process equipment members after the irradiation, and the irradiation is performed while the materials are in contact with one another. For example, in the embodiment of FIG. 6, shortly after irradiation with laser radiation 620, the second surface 614 of the strip of thermoplastic polymer material 610 is contacted with nip roller 655, such that its first surface 612 is forced against the filter membrane 600 and the roller 625 while it is in a softened state.

A variety of types of laser radiation can be used in the practice of the processes and devices described herein, from a variety of different laser sources. For example, in certain embodiments, the laser radiation is of a wavelength in the near infrared (e.g., 800-1300 nm). For example, the laser radiation can be provided by a diode laser (e.g., operating at a wavelength in the range of 800-1000 nm), or a solid-state laser such as an Nd:YAG laser operating at a wavelength of 1064 nm. In other embodiments, the laser radiation is of a wavelength in the mid- or far-infrared. For example, in certain embodiments, the laser radiation is provided by a $CO_2$ laser operating at a wavelength of 10600 nm.

As the person of ordinary skill in the art will appreciate, the laser radiation can be provided in any of a number of ways. For example, a lightguide can be used to deliver the laser radiation to the location where it irradiates the materials. The radiation can be focused or transformed by any necessary optics to provide a narrow zone of irradiation. The zone of irradiation can, for example, be concentrated so that it is not substantially wider than the strip of thermoplastic polymer material, so as to concentrate the heating in the area of the thermoplastic polymer material. The zone of irradiation can be, for example, no more than 20% wider, no more than 10% wider, or even no wider than the strip of thermoplastic polymer material. And in fact, in certain embodiments, the zone of irradiation can be substantially narrower than the strip of thermoplastic polymer material, such that the thermoplastic polymer material is not softened across its entire width. In such embodiments, the strip of thermoplastic material can be protected from breakage, especially when it is under tension so as to help force the softened material into the pores and voids of the filter membrane. In certain embodiments, the zone of irradiation is less than 90%, less than 80%, or even less than 70% of the width of the strip of thermoplastic polymer material (i.e., and is formed entirely on the strip of thermoplastic polymer material).

In a laser welding process as described herein, radiant energy is converted into heat as a result of absorption by a material, providing local melting at the positions where the radiant energy is absorbed. The degree of heating at a particular position within a material depends on a number of factors, including the absorption spectrum of the material and the depth of the position within the material. Typically, polymer materials absorb mid- and far-infrared radiation (e.g., $CO_2$ laser radiation) with a high absorbance coefficient. Nonetheless, in many such cases the strips of thermoplastic polymer materials described herein can be thin enough that they can soften (e.g., melt) throughout their thickness, even when irradiated from the second surface thereof. Alternatively, in other such embodiments, the strip of thermoplastic polymer material is softened at its first surface, but not at its second surface. For example, as described above with respect to FIG. 5, the strip of thermoplastic polymer can be irradiated from the first surface thereof, before such first surface is contacted with the first surface of the filter membrane. Other such embodiments are described below.

In other embodiments, as described above, the laser radiation is near-infrared radiation. Many base polymer materials do not themselves have a high absorbance coefficient in the near-infrared, and so near-infrared radiation can pass therethrough without causing significant softening thereof. In such cases, an absorbing component can be included in the material of the strip of thermoplastic polymer material. The absorbing component is selected to absorb the laser radiation, converting the radiant energy to heat and thereby causing the material at (at least) the first surface of the thermoplastic polymer material to soften. The absorbing component can be included within the strip of thermoplastic polymer material at any position that will allow for softening at the first surface thereof. For example, in certain embodiments, the absorbing component is provided throughout the strip of thermoplastic polymer material. In other embodiments, the absorbing component is provided only through a partial thickness of the strip of thermoplastic polymer material, e.g., only in a layer adjacent the first surface thereof (e.g., sufficiently close to provide for selective softening at the first surface thereof as compared to the second surface thereof). The absorbing component can be, for example, a dye or a pigment, such as carbon black; other absorbing components are known in the art. In some cases, however, the base polymer material of the strip of thermoplastic polymer material is absorptive enough of near-infrared radiation that it can be softened without the use of an absorbing component. When the laser radiation is near-infrared radiation, the laser radiation can be provided at the second surface of the strip of thermoplastic polymer material, or at the first surface of the strip of thermoplastic polymer material. In other embodiments, the laser radiation is provided at the second surface of the filter membrane; the filter membrane can be sufficiently transmissive to the near-infrared radiation to allow radiation to be transmitted through the filter membrane and into the strip of thermoplastic polymer material to be absorbed.

Figure 7:
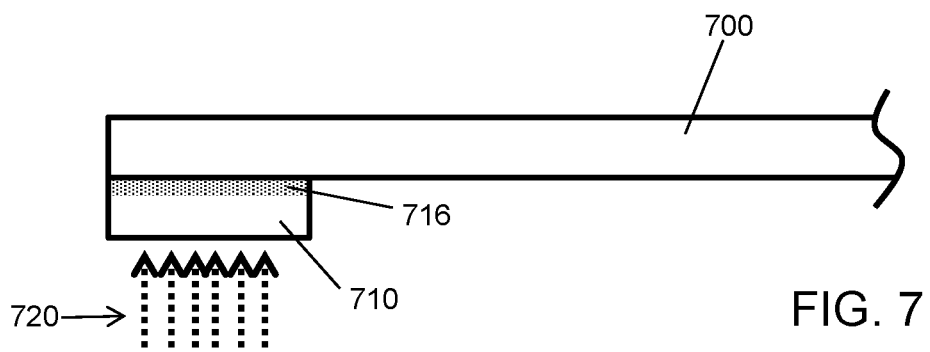
FIG. 7 is a schematic cross-sectional view of a process according to another embodiment of the disclosure.

For example, in the embodiment of FIG. 1, the laser radiation is provided at the second surface of the strip of thermoplastic polymer material. In certain such embodiments (e.g., when the thermoplastic polymer material strongly absorbs the laser radiation), the laser radiation can soften the thermoplastic polymer material substantially through its entire thickness. In other such embodiments, the laser radiation does not soften the thermoplastic polymer material substantially through its entire thickness. For example, in certain embodiments, the thermoplastic polymer material includes an absorbing component only in the neighborhood of its first surface, e.g., in a layer adjacent its first surface. FIG. 7 is a schematic cross-sectional view of such a process. Here, filter membrane 700 and strip of thermoplastic material 710 are contacted with one another as described above. Notably, the strip of thermoplastic polymer material 710 includes an absorbing component 716 in a layer adjacent its first surface. The base thermoplastic polymer material itself does not substantially absorb the laser radiation 720 (e.g., near-infrared radiation as described above), but the absorbing component does, thereby heating and softening the thermoplastic polymer material at its first surface.

In certain embodiments of the processes as described herein, the first surface of the strip of thermoplastic polymer material is softened by absorption of the laser radiation by the filter membrane and heat transfer from the filter membrane to the strip of thermoplastic polymer material. For example, in certain embodiments of the configuration of FIG. 1, the laser radiation is not strongly absorbed by the strip of thermoplastic material 110 but is strongly absorbed by the filter membrane 100. In such embodiments, the filter membrane can heat up at at least its first surface. This heat can be transferred through contact to the first surface of the strip of thermoplastic material, thereby softening (e.g., melting) the strip of thermoplastic material at the first surface thereof. In certain alternative embodiments, the laser radiation can be provided at the second surface of the filter membrane; in such embodiments, the filter membrane can be heated through its thickness, such that the temperature at the first surface thereof is sufficient to soften or even melt the material at the first surface of the strip of thermoplastic polymer material. In certain of the heat-transfer embodiments described here, the strip of thermoplastic material is not softened (or, alternatively, not melted) at the second surface thereof.

Figure 8:
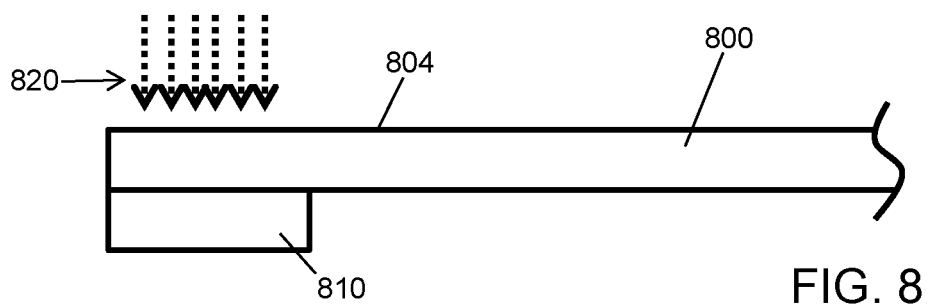
FIG. 8 is a schematic cross-sectional view of a process according to another embodiment of the disclosure.

FIG. 8 is a schematic cross-sectional view of another embodiment of the disclosure. In the process of FIG. 8, filter membrane 800 and strip of thermoplastic material 810 are contacted with one another as described above, and irradiated by laser radiation 820 provided at the second surface 804 of filter membrane 800. Here, if the radiation is strongly absorbed by the materials of the filter membrane and the strip of thermoplastic polymer material, both will heat up, but the materials are desirably selected such that only the strip of thermoplastic polymer material softens. In other embodiments, the radiation is not strongly absorbed by the filter membrane, but is strongly absorbed by the strip of thermoplastic polymer material at least at its first surface (e.g., through use of an absorbing component as described above, or through use of a thermoplastic polymer material that itself absorbs the radiation).

One advantage according to certain embodiments of the processes described herein is that the filter membrane can be maintained at a desirably low temperature in order to avoid damage thereto. In certain embodiments of the processes described herein, however, the filter membrane is at an elevated temperature when in contact with the softened material at the first surface of the strip of thermoplastic polymer material. This can help the softened thermoplastic polymer embed itself into the pores or voids of the filter membrane. For example, the filter membrane can be heated to a temperature in the range of about 50° C. to about 150° C. when in contact with the softened material at the first surface of the strip of thermoplastic polymer material. Heat can be provided, e.g., by the process equipment member (e.g., roller or platen) on which the filter membrane is disposed during the irradiation, or by a heater provided at another point in the process flow. In other embodiments, however, the process equipment member on which the filter membrane is disposed during the irradiation is not heated, e.g., is maintained at a temperature of 40° C. or lower. In such cases, the process equipment member can act as a heat sink for the filter membrane.

As described herein, the material at (at least) the first surface of the strip of thermoplastic polymer material is softened by irradiation with laser radiation, e.g., by absorption of the radiation within the strip of thermoplastic polymer material, or by absorption of the radiation by the filter membrane and heat transfer to the strip of thermoplastic polymer material. In certain embodiments of the processes as otherwise described herein, the strip of thermoplastic polymer material is melted at at least its first surface by irradiation with laser radiation. However, in certain such embodiments, the strip of thermoplastic polymer material is not melted (and in some embodiments, not even softened) at its second surface by the irradiation with laser radiation.

As the person of ordinary skill in the art will appreciate, the laminated filter elements can be made in a variety of geometries. For example, a filter element can be formed as a linearly-extending sheet of filter membrane, e.g., having a width in the range of 0.1 m to 2 m, e.g., in the range of 0.25 m to 1 m. Any desirable number of strips of thermoplastic polymer material can be laminated to the filter membrane. For use in making a filter cartridge, a piece of filter membrane typically has a strip of thermoplastic polymer material laminated to each of two opposed edges thereof. Filter membranes are typically provided in widths that are much wider than desirable for use as a single filter, and thus multiple strips of thermoplastic polymer material can be laminated thereto, then the filter membrane can be cut widthwise to form multiple linearly-extending filter elements, each with two strips of thermoplastic polymer material along opposing edges thereof.

The strips of thermoplastic polymer material are typically much narrower than the sheet of filter membrane, and are disposed thereon to provide a surface for sealing the filter membrane to other device components, such as a plastic housing or endcap. In certain embodiments, each strip of thermoplastic polymer material is 0.5 cm to 4 cm in width, e.g., 1 cm to 3 cm. In certain embodiments of the processes and devices as otherwise described herein, the strip of thermoplastic polymer material is bonded to the filter membrane through a substantial fraction of the width of strip of thermoplastic material, e.g., at least 50%, at least 70%, or even at least 90%. The person of ordinary skill in the art can provide laser radiation configured to irradiate the strip of thermoplastic polymer material through such a substantial fraction of its width, e.g., using suitable optics such as lenses and/or mirrors. However, as described above, it can be desirable that the zone of irradiation is not substantially wider than the strip of thermoplastic polymer.

Figure 9:
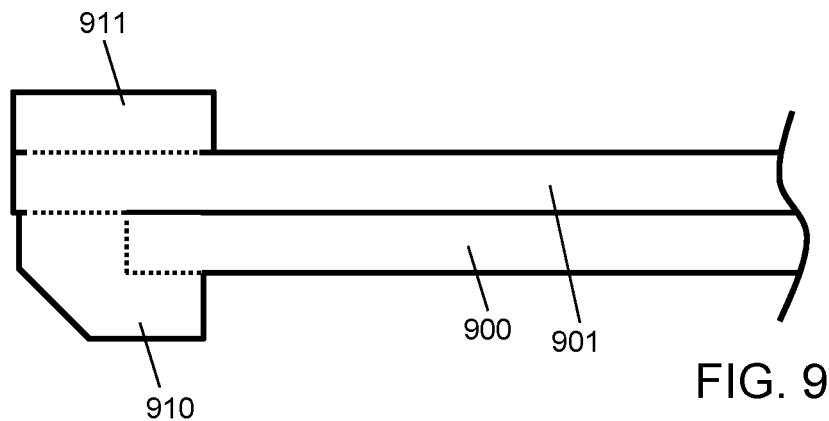
FIG. 9 is a partial schematic cross-sectional view of a filter element according to one embodiment of the disclosure.

While in the embodiments described above, each filter membrane has a strip of thermoplastic material only on one of its two opposing surfaces, the person of ordinary skill in the art will appreciate that the processes described herein can be adapted to provide strips of thermoplastic materials on both opposing surfaces of a filter membrane. Moreover, while in the embodiments described above the filter membrane is provided as a single layer, in certain alternative embodiments the filter membrane can be provided as multiple layers. One embodiment of a filter element made by a process as described herein is shown in partial schematic cross-sectional view in FIG. 9. The filter element includes two layers of filter membrane 900 and 901, as well as strips of thermoplastic polymer material 910 and 911. Notably, strip 910 is bonded to the first surfaces of both layers 900 and 901, thereby sealing them together. Strip 911 is on the opposing second surface of layer 901.

For assembly into a device, filter membrane materials are often physically supported by a layer or structure made from a highly porous but rigid material. When the filter membrane is laminated in the presence of such a support material, the softening point, temperature, and other process parameters described herein can apply also to the support material. But since such support materials are typically not as fragile as the filter membrane, in other embodiments the softening point, temperature, and other process parameters described herein need not apply to the support material.

The person of ordinary skill in the art will appreciate that the filter elements described herein can be used in the manufacture of filter devices such as filter cartridges. Accordingly, another aspect of the disclosure is a filter device (e.g., a filter cartridge) that includes a filter element as described above. Advantageously, in the filter cartridge according to certain embodiments of the disclosure, the second surface of the strip of thermoplastic polymer material is adhered to an element of the filter device (e.g., a structural element such as a device housing or an endcap). The second surface of the strip of thermoplastic material can be adhered to the element of the filter device via an adhesive or other potting material. In other embodiments, the second surface of the strip of thermoplastic material is directly adhered to the element of the filter device.

Figure 10:
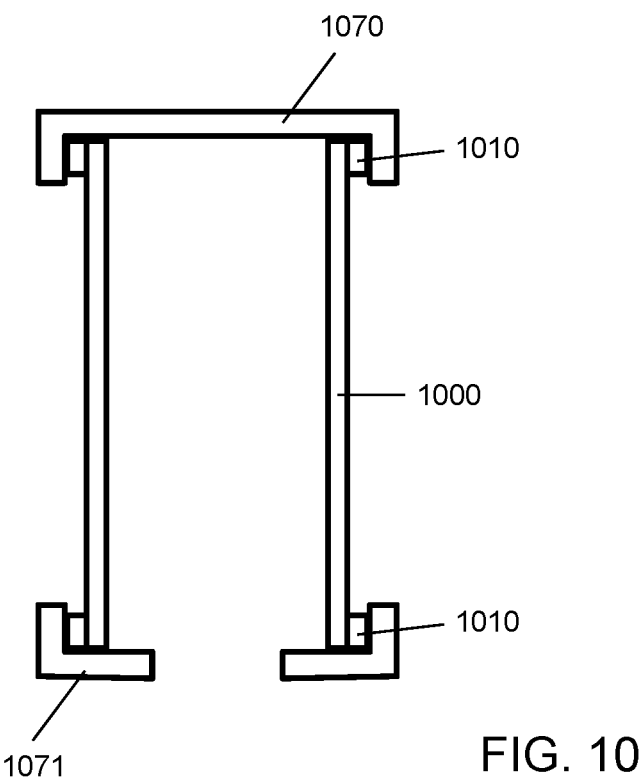
FIG. 10 is a schematic cross-sectional view of a filter device according to one embodiment of the disclosure.

One such generally cylindrical device is shown in partial schematic cross-sectional view in FIG. 10. In the device of FIG. 10, the filter membrane 1000 has strips of thermoplastic polymer material 1010 laminated thereto. The filter membrane is sealed to the endcaps 1070 and 1071 through the thermoplastic polymer material, which can be selected to be highly compatible with the material of the endcap. The endcap material (or other device material to which the thermoplastic polymer material is bound in an assembled device) can be, for example, polypropylene. The filter membrane can be, for example, pleated in the finished device, as is conventional.

Figure 11:
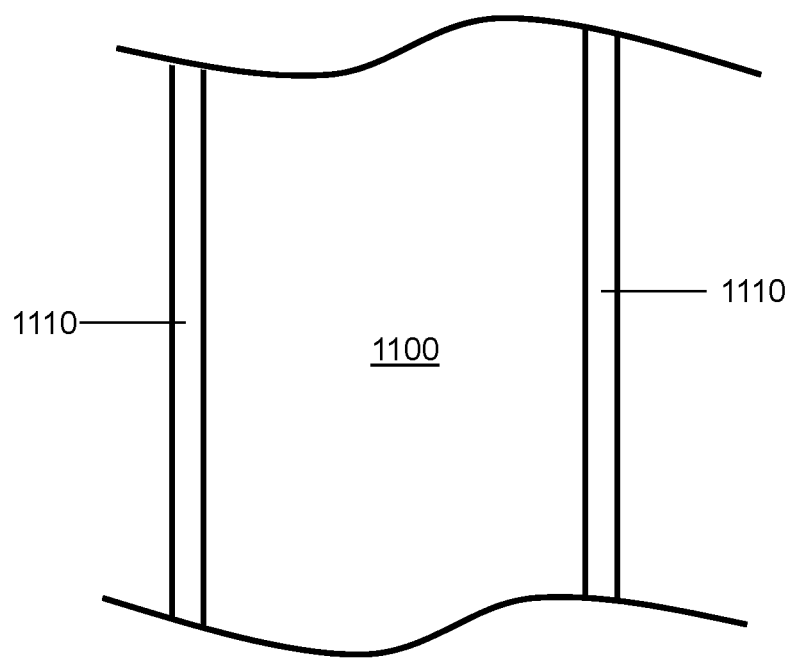
FIG. 11 is a partial schematic plan view of a filter element according to another embodiment of the disclosure.

The laser irradiation processes described herein can be used to make filter elements having a wide variety of architectures. For example, the processes can be used to make linearly-extending filter membranes having one or more strips of thermoplastic material disposed thereon generally parallel to one another and generally parallel to the direction of linear extension of the filter membrane. Such a filter element is shown in schematic plan view in FIG. 11. Filter membrane 1100 extends vertically in the plan view of FIG. 11, and laminated thereto are two strips of thermoplastic polymer material 1110 extending vertically, generally parallel to one another and to the direction of linear extension of the filter membrane.

Figure 12:
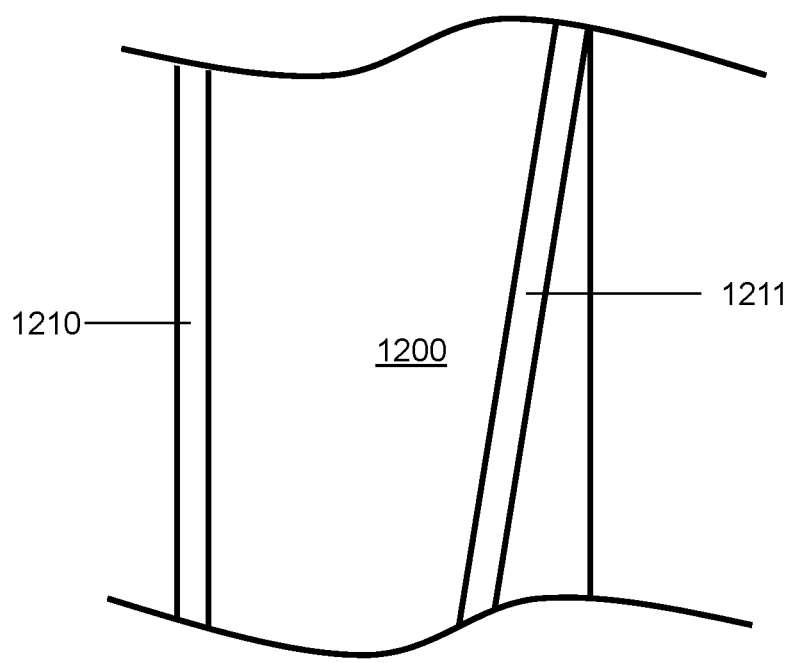
FIG. 12 is a partial schematic plan view of a filter element according to another embodiment of the disclosure.

But, advantageously, the processes described herein can be used to make filter elements having different architectures, e.g., by providing laser radiation in a pattern that is not strictly parallel to the direction of extension of the filter membrane. For example, the processes described herein can be used to make a filter elements in which at least one of the strips of thermoplastic material is not generally parallel to the direction of linear extension of the filter membrane. Such a filter element is shown in schematic plan view in FIG. 12. Filter membrane 1200 extends vertically in the plan view of FIG. 12, and laminated thereto is one strip of thermoplastic polymer material 1210 extending vertically, generally parallel to the direction of linear extension of the filter membrane, and another strip of thermoplastic polymer material 1211 that is formed at an angle to the direction of linear extension of the filter membrane. This can be performed for example, by providing for relative motion of the laser radiation across the filter membrane in a roll-to-roll process. Any excess material (i.e., in the embodiment of FIG. 12, the material not between the strips 1210 and 1211) can be trimmed away.

Figure 13:
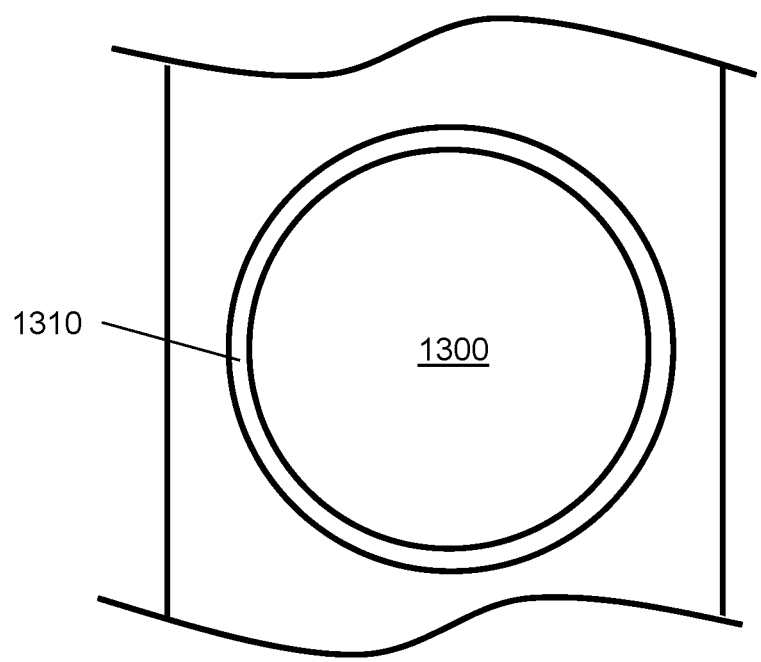
FIG. 13 is a schematic plan view of a filter element according to another embodiment of the disclosure.

The processes described herein can also be used to make, for example, filter elements having a closed path of one or more strips of thermoplastic polymer material. Such a filter element is shown in schematic plan view in FIG. 13. Laminated to filter membrane 1300 is a strip of thermoplastic polymer material 1310 formed in generally circular pattern. Of course, other shapes can be formed, e.g., oval, elliptical, polygonal. Such membranes can be useful to make disk-shape filters as known in the art. Such membranes can be made using the processes described herein, for example, by moving the laser radiation across the filter membrane in a desired (e.g., circular) pattern, or by using suitable optics (e.g., diffractive optics) to shape the radiation in a desired (e.g., circular) pattern. Multiple such filter elements can be made in roll-to-roll processing, for example, by forming a first set of one or more filter elements across the width of a roll of filter membrane, then advancing the roll and forming another set of one or more filter elements. The laser radiation can be turned off or diverted from the process while the roll is advanced; however, if the roll can be advanced much more quickly than the thermoplastic polymer material softens, then the advancement of the roll may be performed in the presence of the laser radiation.

Another aspect of the disclosure is a filter element made by any process as described herein, or having any of the characteristics as described herein.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A process for making a filter element comprising a filter membrane having a strip of thermoplastic polymer material laminated thereto, the method comprising:
    providing a sheet of filter membrane having a first surface and an opposed second surface;
    providing a strip of thermoplastic polymer material having a first surface and an opposed second surface;
    contacting the first surface of the strip of thermoplastic polymer material with the first surface of the filter membrane; and
    softening the strip of thermoplastic polymer material at at least its first surface by irradiation with laser radiation without softening the sheet of filter membrane at the position at which the strip of thermoplastic polymer is contacted, and such that the temperature of the strip of thermoplastic material at the first surface thereof remains at least 50 ° C. less than the softening point of the material of the filter membrane while they are in contact with one another;
    such that the softened polymer material of the first surface of the strip of thermoplastic polymer material bonds to the first surface of the filter membrane upon hardening,
    wherein the melting point of the thermoplastic polymer material is at least 50° C. lower than the softening point of the material of the filter membrane,
    wherein the process is performed without contacting both the second surface of the strip of thermoplastic material and the second surface of the filter membrane within 2 cm of the strip of thermoplastic polymer material with a process equipment member while the first surface of the strip of thermoplastic polymer material is in a softened state, and
    wherein the process is a continuous roll-to-roll process, in which the sheet of polymeric filter membrane is dispensed from a first roll, and the filter membrane having the strip of thermoplastic polymer material laminated thereto is collected on a second roll.

2. The process according to claim 1, wherein the laser radiation is mid-infrared radiation or far-infrared radiation, or near-infrared radiation.

3. The process according to claim 2, wherein the strip of thermoplastic polymer material includes an absorbing component provided throughout the strip of thermoplastic polymer material.

4. The process according to claim 2, wherein the strip of thermoplastic polymer material includes an absorbing component provided only in a layer of the strip of thermoplastic polymer material adjacent the first surface thereof.

5. The process according to claim 1, wherein the strip of thermoplastic polymer material is melted at at least its first surface by irradiation with laser radiation.

6. The process according to claim 5, wherein the strip of thermoplastic polymer material is not melted at its second surface by the irradiation with laser radiation.

7. The process according to claim 1, wherein softening of the strip of thermoplastic material is performed such that the temperature of the strip of thermoplastic material at the first surface thereof remains at least 100° C. less than the softening point of the material of the filter membrane when they are in contact with one another.

8. The process according to claim 7, wherein the softening point of the thermoplastic polymer material is at least 100° C. lower than the softening point of the material of the filter membrane.

9. The process according to claim 1, wherein a base material of the filter membrane is polyethersulfone (PES), poly(tetrafluoroethylene) (PTFE), or poly(vinylidene difluoride) (PVDF).

10. The process according to claim 1, wherein the thermoplastic polymer material is polypropylene, nylon, or a blend of nylon and polypropylene.

11. The process according to claim 1, wherein the softening point of the thermoplastic polymer material is at least 75° C. lower than the softening point of the material of the filter membrane.

12. The process according to claim 1, wherein the filter membrane is in the range of about 10 pm to about 300 pm in thickness, and the strip of thermoplastic polymer material is in the range of about 10 µm to about 300 µm in thickness.

13. The process according to claim 1, wherein the material at the first surface of the strip of thermoplastic polymer is softened with irradiation by laser radiation, then the first surface of the strip of thermoplastic polymer is contacted with the first surface of the filter membrane.

14. The process according to claim 1, wherein the first surface of the strip of thermoplastic polymer is first contacted with the first surface of the filter membrane, then the material at the first surface of the strip of thermoplastic polymer is softened while it is in contact with the filter membrane.

15. The process according to claim 1, wherein the irradiation does not cause the temperature of the filter membrane to increase by more than 10° C. at any region more than 1° C. from the strip of thermoplastic polymer material.

16. The process according to claim 1, wherein the strip of thermoplastic polymer material is irradiated with laser radiation that forms a zone of radiation that is no more than 20% wider than the strip of thermoplastic polymer material.

17. The process according to claim 1, wherein the strip of thermoplastic polymer material is irradiated with laser radiation that forms a zone of radiation that is no more than 90% of the width of the strip of thermoplastic polymer material.

18. The process according to claim 1, wherein a base material of the filter membrane is polyethersulfone (PES), poly(tetrafluoroethylene) (PTFE), or poly(vinylidene difluoride) (PVDF), and the thermoplastic polymer material is polypropylene, nylon, or a blend of nylon and polypropylene.

19. The process according to claim 1, wherein the strip of thermoplastic material is supplied from a spool.

* * * * *